United States Patent
Ganser et al.

[11] Patent Number: 5,684,627
[45] Date of Patent: Nov. 4, 1997

[54] MICROSCOPE WITH A MULTI-FUNCTIONAL ADJUSTMENT KNOB

[75] Inventors: Michael Ganser, Giessen; Klaus Felgenhauer, Greifenstein-Beilstein; Karl-Josef Schalz, Weilburg, all of Germany

[73] Assignee: Leica Mikroskopie und Systeme GmbH, Wetzlar, Germany

[21] Appl. No.: 397,246

[22] PCT Filed: Sep. 3, 1993

[86] PCT No.: PCT/DE93/00797

§ 371 Date: Apr. 24, 1995

§ 102(e) Date: Apr. 24, 1995

[87] PCT Pub. No.: WO94/07172

PCT Pub. Date: Mar. 31, 1994

[30] Foreign Application Priority Data

Sep. 19, 1992 [DE] Germany ............... 42 31 379.1

[51] Int. Cl.⁶ ............................. G02B 21/06; G02B 21/00
[52] U.S. Cl. ........................ 359/388; 359/368; 359/383
[58] Field of Search ....................... 359/368–396; 250/201.2–201.8

[56] References Cited

U.S. PATENT DOCUMENTS

| | | | |
|---|---|---|---|
| 4,624,537 | 11/1986 | Hanssen et al. | |
| 4,653,878 | 3/1987 | Nakasalo et al. | 359/381 |
| 4,661,692 | 4/1987 | Kawasaki | 359/381 |
| 4,695,137 | 9/1987 | Jorgen et al. | 359/383 |
| 4,912,388 | 3/1990 | Tanaka et al. | 359/382 |
| 4,930,882 | 6/1990 | Koch et al. | |
| 5,000,554 | 3/1991 | Gibbs | 359/393 |
| 5,000,555 | 3/1991 | Sato | 359/392 |
| 5,103,338 | 4/1992 | Crowley et al. | 359/394 |
| 5,260,632 | 11/1993 | Schalz | 318/606 |
| 5,260,825 | 11/1993 | Nagano et al. | 359/383 |
| 5,557,456 | 9/1996 | Garner et al. | 359/383 |
| 5,559,631 | 9/1996 | Rener et al. | 359/385 |

FOREIGN PATENT DOCUMENTS

| | | |
|---|---|---|
| 92/04666 | 3/1992 | European Pat. Off. |
| 2623299 | 5/1989 | France |
| 36 07 379 | 7/1987 | Germany |
| 61-130914 | 6/1986 | Japan |

*Primary Examiner*—Thong Nguyen
*Attorney, Agent, or Firm*—Foley & Lardner

[57] ABSTRACT

A microscope (1) is described which has an adjustment knob (2) arranged on the microscope (1) and an encoder (6) assigned to the adjustment knob (2). The encoder (6) is connected to a control device (3). The control device (3) is assigned positioning motors (4, 14, 18, 23, 24) for motorized setting of different microscope functions. The preselected function which can be controlled by motor is preselected via switches (7, 11, 15, 19, 21) arranged on the microscope (1) and triggered via the control device (3) as a function of the encoder pulses generated by the adjustment knob (2). The motor drives are assigned sensors (8) which detect the operating position of the activated microscope function. When the maximum operating position is reached, a braking motor (9) connected to the adjustment knob (2) is activated via the control device (3) and renders the rotation of the adjustment knob (2) more difficult up to complete blockage.

14 Claims, 2 Drawing Sheets

MICROSCOPE WITH A MULTI-FUNCTIONAL ADJUSTMENT KNOB

The invention relates to a microscope.

In the case of microscopes having functions designed to be motor-driven or semiautomatic, the operating controls, which are to be manually operated, are designed as keys and combined to form a keyboard. This keyboard is either arranged directly on the microscope stand, or else is provided in a separate keyboard console. The use of keys for operating microscope functions which are to be set discretely, such as, for example, switching over the turret, or switching on/off/over the individual lamps of the microscope illumination, is acceptable where the function does not require sensitive setting. However, if microscope functions are operated by keys where sensitive setting is required such as, for example, focusing of the microscope lens, setting stops, controlling the brightness of the lamps, or a X-Y- displacement of the microscope stage, keys are unsuitable as operating controls.

DE 36 07 379 C1 discloses a microscope having a turret, which can be switched by motor, and a motor-driven focusing drive mechanism. As a manipulator of fine setting, the focusing device has a rotating knob with an assigned encoder in a separate keyboard console arranged next to the microscope. Moreover, an additional switch for the turret is provided in this keyboard console.

The device described has the disadvantage that only the motor-driven fine focal setting is performed via a handwheel.

SUMMARY OF THE INVENTION

It is therefore an object of the present invention to provide a device in which starting from the known adjustment knob for focal setting, additional microscope functions can be controlled via this adjustment knob.

This object is achieved according to the invention by means of the features described below.

BRIEF DESCRIPTION OF THE DRAWINGS

The invention is explained in more detail on the basis of an exemplary embodiment with the aid of diagrammatic drawings, in which.

DETAILED DESCRIPTION OF AN EXEMPLARY EMBODIMENT

Figure 1:
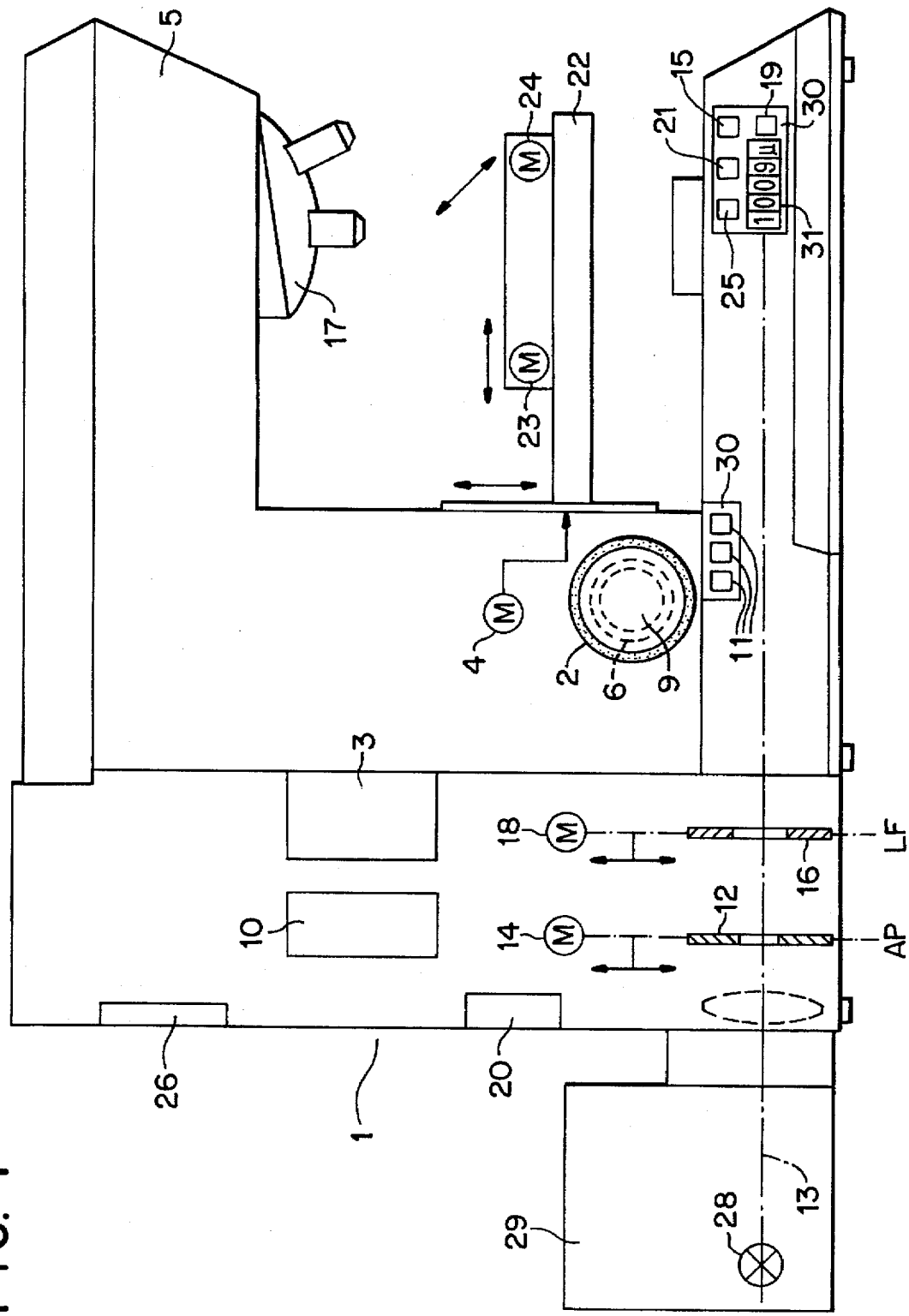
FIG. 1 shows a side view of the microscope.

FIG. 1 shows a microscope I having a turret 17, an object stage 22 which can be adjusted by a motor in the Z- direction and on which an X- Y- scanning device having the drive motors 23 and 24 is arranged, a focusing device having a stepping motor 4, and a central adjustment knob 2 which is coupled to an encoder 6. In the case of a slower or faster rotation of the adjustment knob 2, the encoder 6 outputs a slower or faster pulse train. A control device 3 records only the number of the pulses.

A plurality of switches 11; 15; 19; 21; 25 are provided on the microscope stand 5 and are electrically connected to the control device 3. Further arranged in the microscope 1 are a brightness control device 20 for the lamphouse 29 having a light source 28, a speed control circuit 10 for the focusing drive 4, and an interface 26. Stops 12; 16 whose aperture can be varied via one motor 14; 18 each, are respectively arranged in the aperture stop plane AP and the radiant field stop plane LF in the illuminating beam path 13 of the microscope 1.

The adjustment knob 2 having the downstream encoder 6 is electrically connected to the control device 3. During rotation of the knob 2, the pulses generated by the encoder 6 are recorded in the control device 3. The control device 3 applies current to the motor 4, preferably a stepping motor, for the purpose of appropriate Z- adjustment of the object stage 22. The number of the encoder pulses determines the travel of the motor, and the number of the pulses per unit of time determines the speed of the motor adjustment. Further superimposed on this Z- adjustment via three preselection keys 11 and a speed control circuit 10 is a manually preselectable speed component which multiplies or reduces the encoder pulse train, which is a function of the rotation of the adjustment knob 2. This can, for example, be utilized to control a soft start of the motor control unit.

In this way, a mechanical transmission gear is simulated using the preselection keys 11, that is to say for the purpose of focusing an arbitrary lens the operator can preselect the function of fine or coarse focusing control via a corresponding speed. An individual pulse output by the encoder 6 is used for this purpose, for example, in order to control two or more steps at the motor 4, so as to achieve a higher transmission ratio. This is advantageous, for example, in focusing lenses of low magnification. The expedient gear transmission can also be performed automatically by the control device 3 in conjunction with coded lens changing devices.

Connected downstream of the encoder 6 is a stepping motor 9 which is connected electrically to the control device 3 and joined mechanically to the shaft of the adjustment knob 2. The stepping motor 9 is designed as an electrically operating brake for the adjustment knob 2. In prescribed operating ranges, for example in the region of the upper and lower end stops of the microscope stage 22, the stepping motor 9 is firstly switched to zero current via the control device 3, and is therefore co-rotated by the adjustment knob 2 without hindrance. Upon reaching the limit of the operating range, which can, for example, be defined by suitable threshold values, such as a maximum permissible pulse number, the motor 9 is supplied with current via the control device. The adjustment knob 2 is more difficult to rotate further in this state. The control device 3 can control this function in such a way, for example, that the sluggishness of the adjustment knob 2 is continuously increased upon reaching the limit of the operating range up to complete blockage.

An X- Y- scanning device having drive motors 23 and 24 is provided on the microscope stage 22. The X- and Y-movement is likewise controlled via the adjustment knob 2. For this purpose, the preselector switch 25 is electrically connected to the control device 3. Upon actuating this switch, the function of the Z- drive of the adjustment knob 2, for example, is switched over to the function of the X- or Y- drive. Specific X- and Y- positions can thus be approached one after another for an object by means of the adjustment knob 2. The functioning of the stepping motor 9 is maintained in a fashion analogous to the Z- drive. The maximum X- and Y- travels are permissible here as the limits of the operating range.

The brightness control device 20 for the light source 28 is also electrically connected to the control device 3. The function of brightness control is switched onto the adjustment knob 2 via the switch 21. In a fashion analogous to the modes of operation already described, the brightness of the light source 28 can be adjusted via the encoder pulses of the adjustment knob 2.

The aperture stop 12 and the radiant field stop 16, which can be controlled by a motor, are activated via the switches 15 and 19. The positioning motors 14 and 18 are electrically connected to the control device 3. After activation of the respective switch 15 or 19, the positioning motor 14 or 18 is controlled by the adjustment knob 2, and the corresponding setting of the stop 12 or 16 is undertaken.

The drive or positioning motors described are respectively stepping motors which are driven via individual pulses output by the encoder 6 which can be counted in the control device 3. The position of the stops 12; 16, the microscope stage 22 and the scanning device can be determined via the recorded pulses. If stepping motors are not employed, it is possible to arrange on the positioners sensors 8 which are electrically connected to the control device 3 and communicate the respective position of the component to be set to the control device 3.

Additionally provided on the microscope i is an interface 26 which is connected to the control device 3. An external keyboard console 27 for controlling the described microscope functions can be connected via the interface 26. When the microscope is used in an overall system such as, for example, a wafer inspection station, the microscope functions can also be undertaken by a higher-level control device via the interface.

Figure 2:
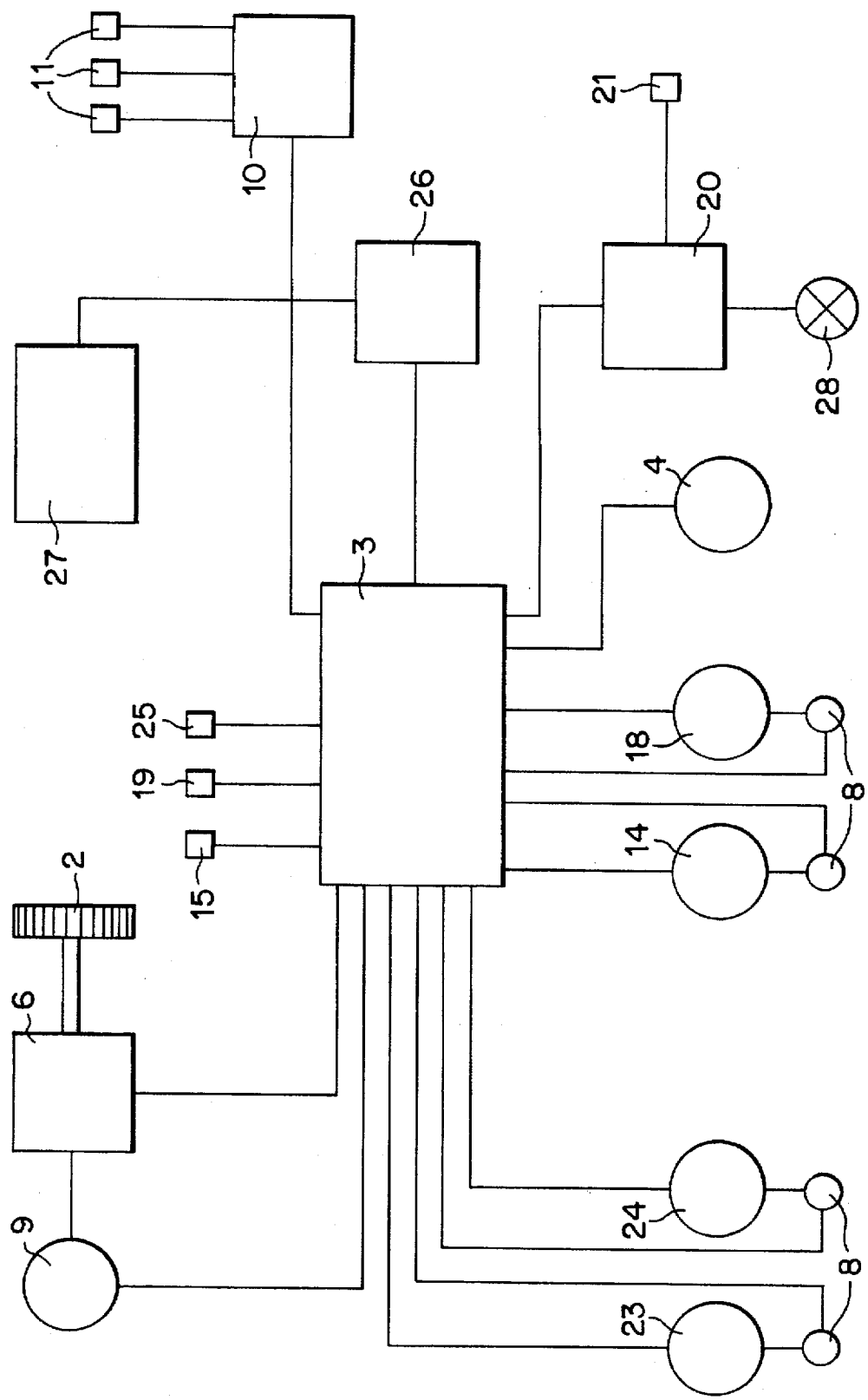
FIG. 2 shows a block diagram of the individual circuits.

FIG. 2 shows a block diagram of the individual circuits with the associated electrical connections. The switches 15 and 19 as well as the positioning motors 14 and 18 for the aperture stop 12 and radiant field stop 16 are connected to the central control device 3. The motors 14 and 18 are here assigned sensors 8 for monitoring the stop position. The central adjustment knob 2 is connected via a shaft to the encoder 6 and the downstream stepping motor 9. These components are connected to the control device 3 via lines.

The speed control circuit 10 is connected to three preselection switches 11 and the control device 3. The focusing motor 4 is connected to the control device 3 via a line. Discrete speeds, that is to say transmission ratios, for the focusing drive can be preselected via the preselection switches 11. It is achieved as a result that, for example, in the case of a lens of low magnification, a larger travel of the microscope stage 22 is initiated by a rotation at the adjustment knob 2, than in the case of a different preselection switch 11 for a lens of higher magnification.

The switch 21 and the light source 28 are connected to the control device 3 via the brightness control device 20.

The drive motors 23 and 24 for the scanning device are connected to sensors 8 for monitoring the X- Y- coordinates with the control circuit 3. The preselection switch 25 for activating the X- or Y- adjustment is electrically connected to the control circuit 3.

An externally arranged keyboard console 27 for controlling the described microscope functions is connected to the interface 26 of the control circuit 3. The motor-operated microscope functions can be driven and operated via the keyboard console.

The invention is not limited only to the motor-controlled microscope functions described here, but can be used in microscope systems wherever sensitive and individually controllable settings or sensitivities are required. Via the stepping motor 9 provided as a brake, the adjustment knob 2 behaves as though it would run against a mechanical stop in the conventional way.

Only one adjustment knob 2 is represented in the figures. Of course, it is also possible for ergonomic reasons to arrange an additional adjustment knob on the other side of the microscope stand in a manner analogous to the known coaxial focusing knobs of conventional microscopes.

Furthermore, the adjustment knob can be designed as a coaxial adjustment knob having an external element for the coarse focus control and an internal element for the fine focusing control. The two elements can be connected to the downstream encoder via a gear.

It was assumed in the description of the exemplary embodiment that the selection switches assigned to the individual functions are configured as individual elements. It is, however, particularly advantageous for assembly reasons if the switches are combined in keyboards 30. The latter can be arranged at arbitrary, ergonomically sensible positions on the microscope stand and be connected to the control device. In particular, in this way even duplicate provision for right-handed and left-handed operation is easy to implement.

In addition, it is possible to integrate into such a keyboard 30 a display panel 31 which displays the positions, determined by the sensors 8, of the respectively activated drive motors, or specifies the travels, stop apertures, lamp currents etc. corresponding to the counted encoder pulses. The respectively activated keys can be identified by luminous signals.

List of Reference Symbols

1—Microscope
2—Adjustment knob
3—Control device
4—Focusing motor
5—Microscope stand
6—Encoder
7—Switch
8—Sensors
9—Motor (for adjustment knobs 2)
10—Speed control circuit
11—Preselection switch (speed control circuit 10)
12—Aperture stop
13—Illuminating beam path
14—Positioning motor (for aperture stop 12)
15—Switch (positioning motor 14)
16—Radiant field stop
17—Turret
18—Positioning motor (radiant field stop 16)
19—Switch (positioning motor 18)
20—control device
21—Switch (for brightness control device 20)
22—Microscope stage
23—Positioning motor (for x- adjustment of 22)
24—Positioning motor (for y- adjustment of 22)
25—Preselection switch (for positioning motors 23 and 24)
26—Interface
27—Keyboard console
28—Light source
29—Lamphouse
30—Keyboard
31—Display panel
AP—Aperture stop plane
LF—Radiant field stop plane

We claim:
1. A microscope comprising:
   a microscope stand;
   a focusing assembly supported by said microscope stand;
   a first motor for controlling said focusing assembly to focus said microscope;
   at least one secondary motor to control a feature other than focusing;
   an adjustment knob on said microscope stand;

an encoder, connected to said adjustment knob, said encoder generating signals in accordance with rotation of said adjustment knob;

a first switch; and a control unit, connected to said encoder and to said first switch, which receives said signals generated by said encoder and which selectively controls said first motor or said secondary motor based on a setting of said first switch.

2. A microscope according to claim 1, further comprising a stage and wherein said at least one secondary motor includes a motor for adjusting an X-position of said stage.

3. A microscope according to claim 1, further comprising a stage and wherein said at least one secondary motor includes a motor for adjusting a Y-position of said stage.

4. A microscope according to claim 1, wherein said at least one secondary motor includes an aperture stop positioning motor.

5. A microscope according to claim 1, wherein said at least one secondary motor includes a radiant field stop positioning motor.

6. A microscope according to claim 1, wherein said first switch is located on said microscope stand.

7. A microscope according to claim 1, further comprising a sensor, coupled to said control unit, to monitor movement by said secondary motor.

8. A microscope according to claim 1, further comprising an electric brake, connected to said adjustment knob, which is controlled by said control unit to render rotation of said adjustment knob difficult near an end of an adjustment range.

9. A microscope according to claim 1, further comprising a speed control unit and speed control switches on said microscope stand to set different transmission steps for said first motor.

10. A microscope according to claim 1, further comprising:

a brightness control device; and a second switch which permits adjustment of said brightness control device using said adjustment knob.

11. A microscope according to claim 1, further comprising an interface, electrically connected to said control unit and located on said microscope stand, for receiving external control signals for said control unit.

12. A microscope according to claim 11, further comprising an external keyboard electrically connected to said interface.

13. A microscope comprising:

a microscope stand;

a focusing assembly supported by said microscope stand;

a first motor for controlling said focusing assembly to focus said microscope;

a brightness control device;

an adjustment knob on said microscope stand;

an encoder, connected to said adjustment knob, said encoder generating signals in accordance with rotation of said adjustment knob;

a switch; and a control unit, connected to said encoder and to said switch, which receives said signals generated by said encoder and which selectively controls said first motor or said brightness control device based on a setting of said switch.

14. A microscope according to claim 13, wherein said switch is located on said microscope stand.

* * * * *